US006997504B1

(12) United States Patent
Lang et al.

(10) Patent No.: US 6,997,504 B1
(45) Date of Patent: Feb. 14, 2006

(54) DUAL PIVOT HINGE ASSEMBLY FOR VEHICLES

(75) Inventors: Steven Craig Lang, Columbus, MI (US); Franklin Darrel Landmesser, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/910,232

(22) Filed: Aug. 3, 2004

(51) Int. Cl.
*B60J 5/00* (2006.01)

(52) U.S. Cl. ............................ 296/146.11; 296/146.12; 49/246; 16/334

(58) Field of Classification Search ........... 296/146.11, 296/146.12; 49/246, 248
See application file for complete search history.

(56) References Cited

U.S. PATENT DOCUMENTS

| | | | | |
|---|---|---|---|---|
| 4,157,846 | A * | 6/1979 | Whitcroft | 296/155 |
| 4,389,748 | A * | 6/1983 | Grossman | 16/278 |
| 4,744,127 | A * | 5/1988 | Shadley | 16/302 |
| 4,949,427 | A * | 8/1990 | Keller | 16/335 |
| 5,013,082 | A | 5/1991 | Landmesser | |
| 5,289,615 | A * | 3/1994 | Banks et al. | 49/246 |
| 5,491,875 | A * | 2/1996 | Siladke et al. | 296/190.11 |
| 5,632,065 | A * | 5/1997 | Siladke et al. | 16/335 |
| 5,685,046 | A * | 11/1997 | Neag et al. | 16/366 |
| 5,915,441 | A * | 6/1999 | Schlack | 16/371 |
| 6,030,024 | A * | 2/2000 | Schmidhuber et al. | 296/146.12 |
| 6,141,908 | A * | 11/2000 | Bowen | 49/246 |
| 6,213,535 | B1 | 4/2001 | Landmesser et al. | |
| 6,382,705 | B1 * | 5/2002 | Lang et al. | 296/146.12 |
| 6,386,621 | B1 * | 5/2002 | Kozak et al. | 296/146.11 |
| 6,447,054 | B1 * | 9/2002 | Pietryga et al. | 296/146.12 |
| 6,629,337 | B1 * | 10/2003 | Nania | 16/334 |
| 6,658,803 | B1 * | 12/2003 | Szyjkowski | 49/246 |
| 6,779,831 | B1 * | 8/2004 | Moriyama | 296/146.11 |
| 6,817,063 | B1 * | 11/2004 | Nania | 16/371 |
| 2003/0056323 | A1 * | 3/2003 | Liang et al. | 16/287 |
| 2004/0256882 | A1 * | 12/2004 | McRobert | 296/146.11 |
| 2005/0086770 | A1 * | 4/2005 | Watson et al. | 16/334 |

* cited by examiner

*Primary Examiner*—Kiran B. Patel
(74) *Attorney, Agent, or Firm*—Laura C. Hargitt

(57) ABSTRACT

A dual pivot door hinge assembly for a side door system of a vehicle includes a body side-mounting bracket adapted to be connected to a vehicle body of the vehicle. The dual pivot door hinge assembly also includes a door side-mounting bracket adapted to be connected to a side door of the side door system of the vehicle. The dual pivot door hinge assembly includes at least one load arm pivotally connected to the body side-mounting bracket to form a first pivot axis and pivotally connected to the door side-mounting bracket to form a second pivot axis. The dual pivot door hinge assembly further includes a connecting member operatively interconnecting the first pivot axis and second pivot axis to allow the side door to remain parallel to a side of the vehicle body as the side door is pivoted radially outward and longitudinally.

8 Claims, 5 Drawing Sheets

FIG. 1.
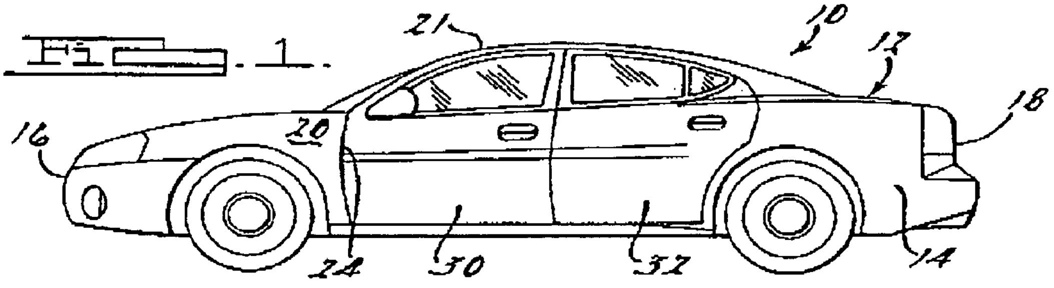
FIG. 2.
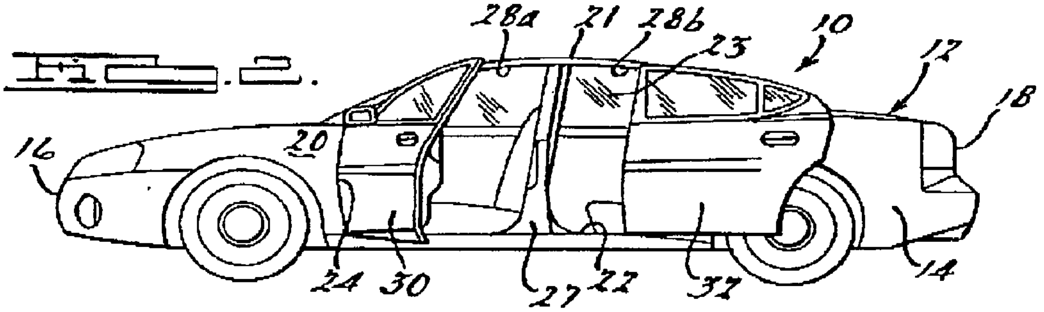
FIG. 3.
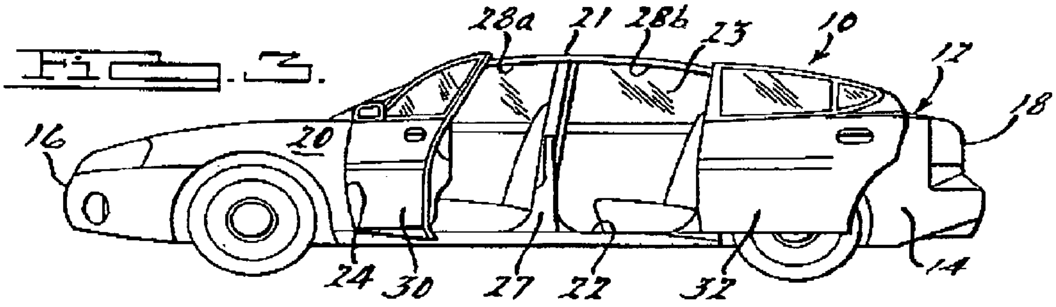
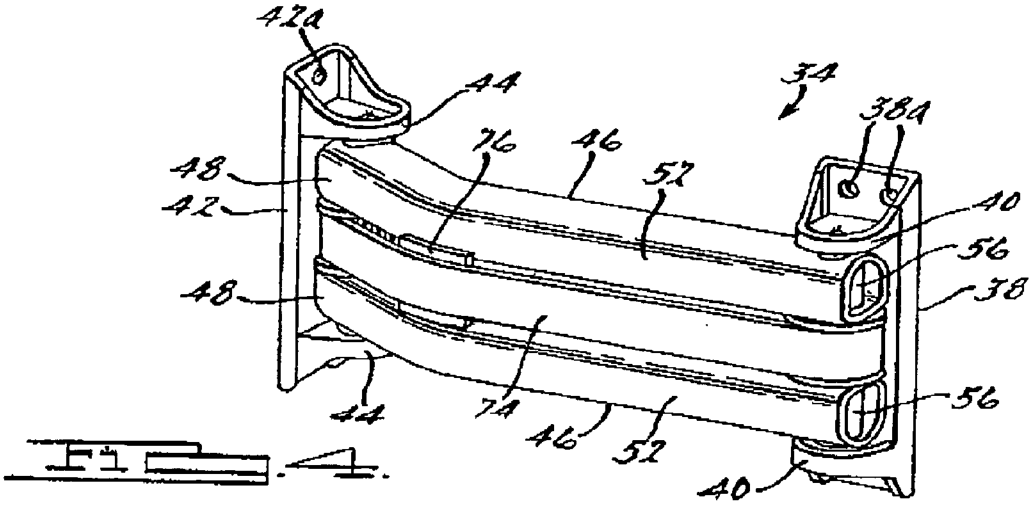
FIG. 4.

DUAL PIVOT HINGE ASSEMBLY FOR VEHICLES

TECHNICAL FIELD

The present invention relates generally to side door systems for vehicles and, more particularly, to a dual pivot hinge assembly for a side door system of a vehicle.

BACKGROUND OF THE INVENTION

It is known to provide a side door system for a side opening in a vehicle body of a vehicle. It is also known to provide a front side door and a rear side door to form the side door system for the vehicle body. In such a side door system, the front side door is hinged or attached to an A pillar of the vehicle body to move between positions of opening and closing for the side opening. The rear side door is hinged or attached to the B pillar of the vehicle body to move between positions for opening and closing the side opening. Typically, a pair of single axis hinges is used for each of the doors to allow the front side door and rear side door to swing out forward with respect to the vehicle.

In another embodiment, the vehicle body may include a continuous side opening extending longitudinally from the A pillar to a C pillar for the side door system. In such a side door system, the front side door is hinged or attached to an A pillar of the vehicle body to move between positions of opening and closing for a front portion of the side opening. The rear side door is hinged or attached to the C pillar of the vehicle body to move between positions for opening and closing a rear portion of the side opening. Typically, a pair of single axis hinges is used for each of the doors to allow the front side door and rear side door to swing out with respect to the vehicle. Typically, the front side door is opened before the rear side door may be opened.

In addition, these side door systems do not allow easy ingress and egress for the vehicle in some parking conditions, for example, in a confined cross car space. With both doors opened and the vehicle parked along side of another vehicle or structure, access to the vehicle is blocked. This results in the occupant having to shuffle between the side doors and the vehicle or having to open and close the rear side door each time they ingress and egress the vehicle, which is undesired.

Therefore, it is desirable to provide a hinge assembly for a side door system of a vehicle that allows easier ingress/egress or loading into the vehicle in tight or confined parking conditions. It is also desirable to eliminate a single axis hinge for a side door system of a vehicle. It is further desirable to provide a hinge assembly that allows a rear side door of a side door system of a vehicle to be opened independently of a front side door of the side door system. Thus, there is a need in the art to provide a hinge assembly for a side door system of a vehicle that meets these desires.

SUMMARY OF THE INVENTION

It is, therefore, one object of the present invention to provide a new hinge assembly for a side door system of a vehicle.

It is another object of the present invention to provide a hinge assembly for a rear side door of a side door system of a vehicle.

To achieve the foregoing objects, the present invention is a dual pivot hinge assembly for a side door system of a vehicle. The dual pivot hinge assembly includes a body side-mounting bracket adapted to be connected to a vehicle body of the vehicle. The dual pivot hinge assembly also includes a door side-mounting bracket adapted to be connected to a side door of the side door system of the vehicle. The dual pivot hinge assembly includes at least one load arm pivotally connected to the body side-mounting bracket to form a first pivot axis and pivotally connected to the door side-mounting bracket to form a second pivot axis. The dual pivot hinge assembly further includes a connecting member operatively interconnecting the first pivot axis and second pivot axis to allow the side door to remain parallel to a side of the vehicle body as the side door is moved outwardly and longitudinally.

One advantage of the present invention is that a dual pivot hinge assembly is provided for a side door system of a vehicle. Another advantage of the present invention is that the dual pivot hinge assembly allows a rear side door of a side door system to be opened independently of a front side door of the side door system. Yet another advantage of the present invention is that the dual pivot hinge assembly eliminates two single axis hinges for a side door of the side door system. Still another advantage of the present invention is that the dual pivot hinge assembly allows the side door to move parallel to the body side opening, while still having the door move in a true radius arc as seen from a seat position. A further advantage of the present invention is that dual pivot hinge assembly allows the side door system to provide easier ingress/egress into an occupant compartment of the vehicle in tight or confined parking conditions. Yet a further advantage of the present invention is that the dual pivot hinge assembly allows the rear side door of the side door system to remain parallel to the body side of the vehicle, when the rear side door is in a full open position. Still a further advantage of the present invention is that the dual pivot hinge assembly provides the side door system with smooth and continuous movement/flow during both open and closing operations. Another advantage of the present invention is that the dual pivot hinge assembly has no exposed hardware or slots on an exterior surface of body side panels or fenders of the vehicle body. Yet another advantage of the present invention is that the dual pivot hinge assembly is that it can be powered to open and close the rear side door.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is a side elevational view of a side door system, according to the present invention, illustrated in operational relationship with a vehicle having a side door illustrated in a fully closed vehicle position.

FIG. 2 is a view similar to FIG. 1 with the side door illustrated in a partially open vehicle position.

FIG. 3 is a view similar to FIG. 1 with the side door illustrated in a fully open vehicle position.

FIG. 4 is an enlarged perspective view of a dual pivot hinge assembly, according to the present invention, of the side door system of FIGS. 1 through 3.

FIG. 9 is view similar to FIG. 7 illustrating the dual pivot hinge assembly and side door illustrated in a fully open vehicle position.

DESCRIPTION OF THE PREFERRED EMBODIMENT

Figure 5:
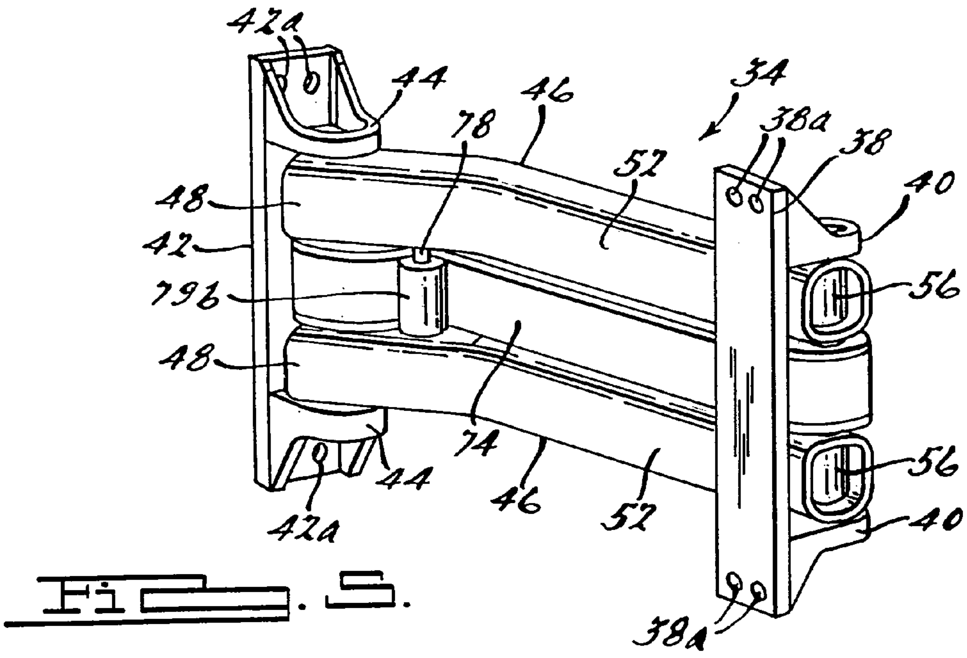
FIG. 5 is a view similar to FIG. 4 illustrating the opposite side of the dual pivot hinge assembly of FIG. 4.
Figure 6:
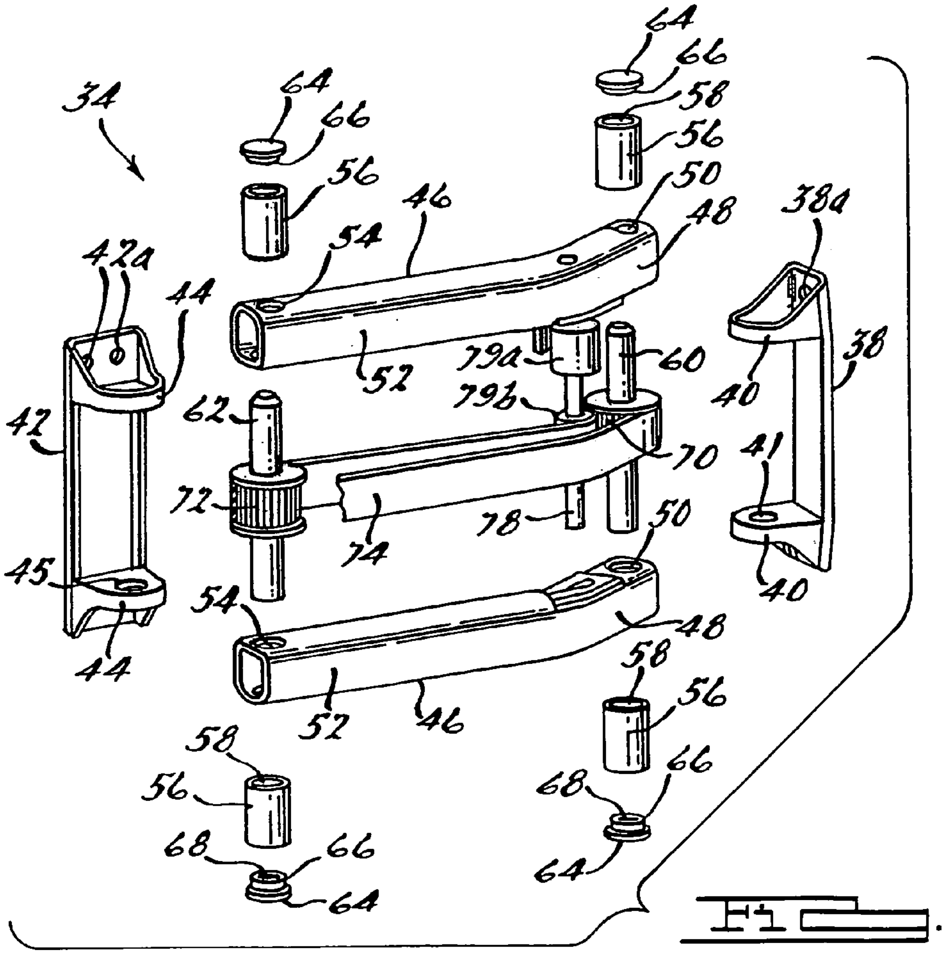
FIG. 6 is an exploded perspective view of the dual pivot hinge assembly of FIGS. 4 and 5.

Referring to the drawings and in particular FIGS. 1 through 3, one embodiment of a side door system 10, according to the present invention, is shown for a vehicle, such as a motor vehicle, generally indicated at 12. The vehicle 12 includes a vehicle body 14 having a forward end 16, a rear end 18, and a pair of sides 20 (one shown) spaced laterally and extending longitudinally between the forward end 16 and the rear end 18. The vehicle body 14 also includes a roof 21 and a floor 22 attached to the sides 20 to form an occupant compartment 23 therein.

The vehicle body 14 also includes at least one side 20 having a forward or "A" pillar 24 and a rear or "C" pillar 26 (FIGS. 7 through 9) spaced longitudinally and extending generally vertically between the roof 21 and the floor 22 of the vehicle body 14. In one embodiment, the vehicle body 14 may include a "B" pillar 27 spaced longitudinally between the A pillar 24 and C pillar 26 and extending generally vertically between the roof 21 and the floor 22 of the vehicle body 14 as illustrated in FIGS. 1 through 3. The vehicle body 14 includes a side opening 28*a* extending longitudinally between the A pillar 24 and the B pillar 27 and vertically between the roof 21 and the floor 22 and a side opening 28*b* extending longitudinally between the B pillar 27 and the C pillar 26 and vertically between the roof 21 and the floor 22. It should be appreciated that, in another embodiment, the vehicle body 14 eliminates the B pillar to provide a continuous and pillarless side door opening in the side 20 extending longitudinally between the pillars 24 and 26 and vertically between the roof 21 and the floor 22. It should also be appreciated that the side door system 10 may be used for the continuous and pillarless side door opening.

The vehicle 12 also includes a front side door 30 disposed in and closing the side opening 28*a*. The front side door 30 faces rearward or toward the rear end 18 of the vehicle body 14 and may be attached at its forward end to the A pillar 24. It should be appreciated that the front side door 30 is hinged with two single pivot hinges (not shown) to allow the front side door 30 to swing outward and forward with respect to the forward end 16 of the vehicle 12.

The side door assembly 10 further includes a second or rear side door 32 disposed in and closing the side opening 28*b*. The rear side door 32 faces forward or toward the front end 16 of the vehicle body 14. The rear side door 32 is attached at its rear end to the C pillar 26 by a dual pivot hinge assembly, according to the present invention and generally indicated at 34, to be described to allow the rear side door 32 to swing outward and rearward with respect to the vehicle 12. The side door assembly 10 further includes a latch (not shown) or latch member (not shown) attached to a front of the rear side door 32 for engagement and disengagement with a latch member (not shown) or latch (not shown) on the vehicle body 14 at the top and bottom of the door opening 28*b*. It should be appreciated that the rear side door 32 may overlap the front side door 30. It should also be appreciated that the side door assembly 10 further includes a latch (not shown) or latch member (not shown) attached to a rear of the front side door 30 for engagement and disengagement with a latch member (not shown) or latch (not shown) on the vehicle body 14. It should also be appreciated that the latch member and latch are conventional and known in the art.

Referring to FIGS. 4 through 9, the side door assembly 10 includes at least one dual pivot hinge assembly, according to the present invention and generally indicated at 34, for attaching the rear side door 32 to the vehicle body 14. The dual pivot hinge assembly 34 allows the rear side door 32 to have a radial opening and closing door swing path, by which the moveable rear side door 32, through its complete door swing path of operation, will remain parallel to the side 20 of the vehicle body 14, from a fully closed position to a fully open position, and back to a fully closed position.

The dual pivot hinge assembly 34 includes a body side-mounting bracket 38 connected to the C pillar 26 by suitable means such as fasteners (not shown) extending through apertures 38*a* in the body side-mounting bracket 38 and connected to fastener/nut reinforcement (not shown). The body side-mounting bracket 38 extends vertically and is generally rectangular in shape. The body side-mounting bracket 38 has at least one, preferably a pair of flanges 40 extending outwardly and spaced vertically for a function to be described. Each of the flanges 40 has an aperture 41 extending therethrough. The body side-mounting bracket 38 is made of a rigid material. The body side-mounting bracket 38 is a monolithic structure being integral, unitary, and one-piece.

The dual pivot hinge assembly 34 also includes a door side-mounting bracket 42 connected to the rear end 38 of the rear side door 36 by suitable means such as fasteners (not shown) extending through apertures 42*a* in the door side-mounting bracket 42. The door side-mounting bracket 42 extends vertically. The door side-mounting bracket 42 has at least one, preferably a pair of flanges 44 extending outwardly and spaced vertically for a function to be described. Each of the flanges 44 has an aperture 45 extending therethrough. The door side-mounting bracket 42 has an integral hold open device (not shown) located on the door side-mounting bracket 42. The door side-mounting bracket 42 is made of a rigid material. The door side-mounting bracket 42 is a monolithic structure being integral, unitary, and one-piece.

The dual pivot hinge assembly 34 includes at least one, preferably a plurality of load or hinge arms 46 operatively interconnecting the body side-mounting bracket 38 and the door-side mounting bracket 42. Each of the load arms 46 is a tubular member extending longitudinally. Each of the load arm 46 has a generally rectangular cross-sectional shape. Each load arm 46 has a body portion 48 extending longitudinally. The body portion 48 has an aperture 50 extending generally vertically therethrough.

The load arm 46 also has a door portion 52 extending longitudinally from the body portion 48 at an angle greater than zero to form a bent arm. The door portion 52 is longer in length than the body portion 48. The door portion 52 has an aperture 54 extending generally vertically therethrough.

The dual pivot hinge assembly 34 includes at least one, preferably a plurality of bushings 56. The bushings 56 are generally cylindrical in shape and have an aperture 58 extending axially therethrough. One of the bushings 56 is disposed within the body portion 48 and door portion 52 of each of the load arms 46 such that the aperture 58 aligns with the corresponding aperture 50,54.

The dual pivot hinge assembly 10 includes a pin 60 to connect the load arms 46 to the body side-mounting bracket 38. The pin 60 is generally cylindrical in shape. The pin 60 extends through the apertures 58 and 50 in the bushing 56 and body portion 48, respectively. The pin 60 also extends through the apertures 41 in the body side-mounting bracket 38 and is secured to the flanges 40 of the body side-mounting bracket 38 by suitable means such as welding to form a first or inboard hinge axis. It should be appreciated that the load arms 46 rotate relative to the pin 60.

The dual pivot hinge assembly 10 includes a pin 62 to connect the load arms 46 to the door side-mounting bracket 42. The pin 62 is generally cylindrical in shape. The pin 62 extends through the apertures 58 and 54 in the bushing 56 and door portion 52, respectively. The pin 62 also extends through the apertures 45 in the door side-mounting bracket 42 and is secured to the flanges 44 of the door side-mounting bracket 42 by suitable means such as welding to form a second or outboard hinge axis. It should be appreciated that the load arms 46 rotate relative to the pin 62.

The dual pivot hinge assembly 10 may include an end cap 64 to close the apertures 41 and 45 in the brackets 38 and 42. The end cap 64 extends radially and has a projection 66 extending axially to be received in the apertures 41 and 45 and a cavity 68 to receive an end of the pins 60 and 62. It should be appreciated that the end caps 64 are secured to the brackets 38 and 42 by press-fitting.

The dual pivot hinge assembly 34 includes a first sprocket 70 mounted to the pin 60 for a function to be described. The dual pivot hinge assembly 34 also includes a second sprocket 72 mounted to the pin 62 for a function to be described. The sprockets 70 and 72 are generally cylindrical in shape. The sprockets 70 and 72 are secured to the pins 60 and 62, respectively, by suitable means such as press-fitting, keys, knurling, or mechanical fasteners. It should be appreciated that the sprockets 70 and 72 are toothed sprockets.

The dual pivot hinge assembly 34 includes a connecting member 74 disposed over the sprockets 70,72 for a function to be described. In one embodiment, the connecting member 74 is a belt such as a timing belt made of a metal material or elastomeric material. It should be appreciated that the connecting member 74 could be a closed loop system that is capable of transmitting the operational load from one sprocket 70,72 to another based on the performance requirements of the side door system 10. It should also be appreciated that the connecting member 74 engages the sprockets 70,72.

The dual pivot hinge assembly 34 includes a guide or rub strip 76 disposed on an inner side of the load arms 46 where the body portion 48 and door portion 54 meet. The rub strip 76 is generally rectangular in shape and made of a plastic material. The rub strip 76 is secured to the load arms 46 by suitable means such as an adhesive. It should be appreciated that the rub strip 76 is contacted by the connecting member 74.

The dual pivot hinge assembly 34 further includes at least one tension pin 78 extending between the load arms 46. The tension pin 78 is a generally cylindrical member made of a metal material such as steel. The tension pin 78 is rotatably secured to the load arms 46 by suitable means such as bushings **79*a* (one shown). The tension pin 78 may include a roller 79*b* disposed thereon to contact the connecting member 74. It should be appreciated that the connecting member 74 extends behind the roller 79*b* of the tension pin 68 to place tension on the connecting member 74. It should also be appreciated that the dual pivot hinge assembly 34 is a complete single hinge assembly attached to the vehicle body 14 and the rear side door 32 by standard metric bolts. It should further be appreciated that the dual pivot hinge assembly 34 is a non-handed assembly and may be used for right hand or left hand applications on the vehicle 12**.

Figure 7:
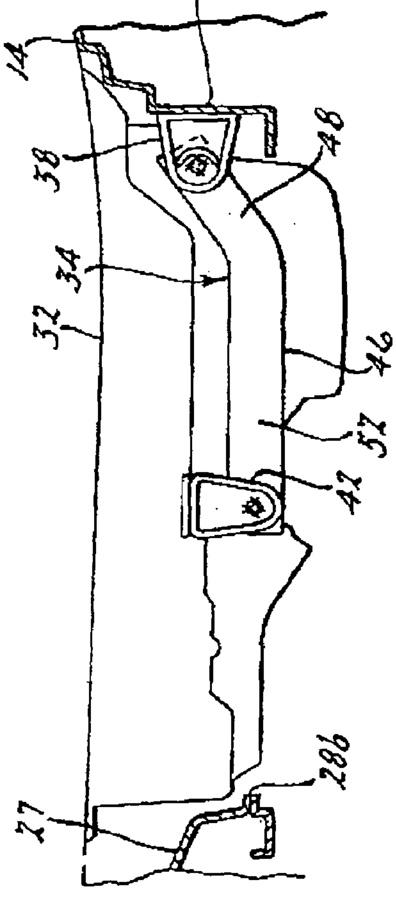
FIG. 7 is a fragmentary view of the dual pivot hinge assembly and a side door of the side door system of FIG. 1 illustrated in a fully closed vehicle position.
Figure 8:
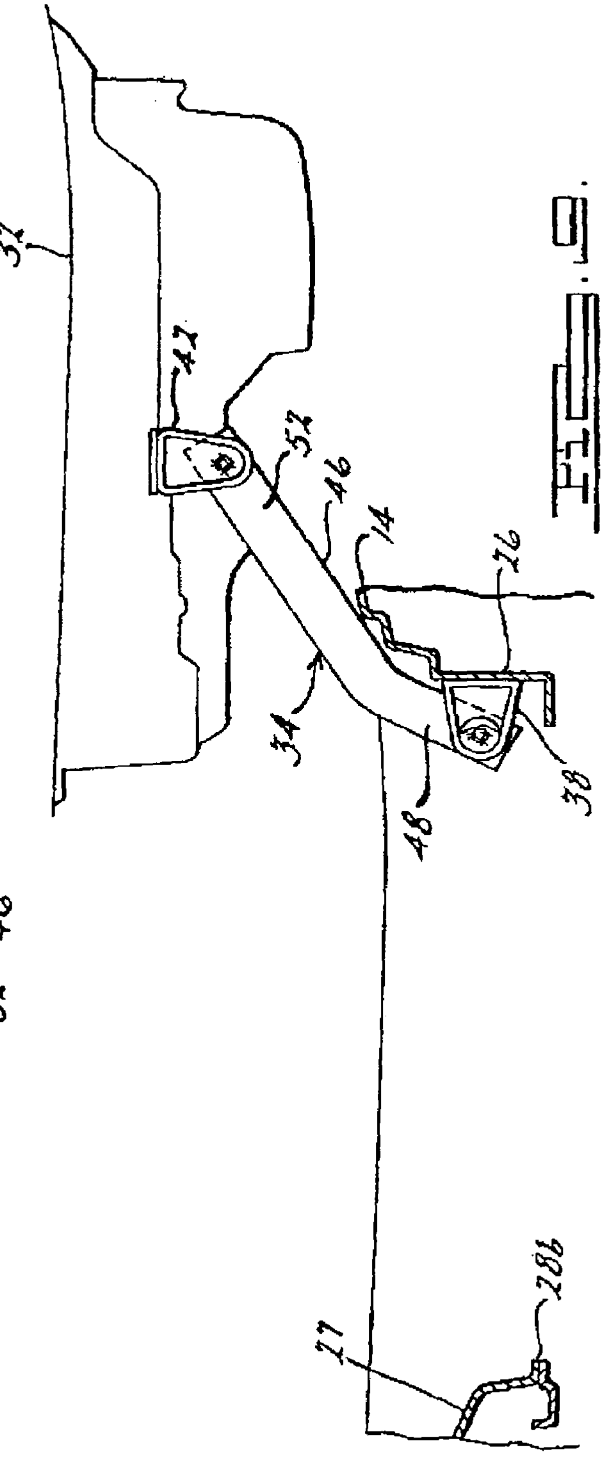
FIG. 8 is view similar to FIG. 7 illustrating the dual pivot hinge assembly and side door illustrated in a partially open vehicle position.
Figure 8:
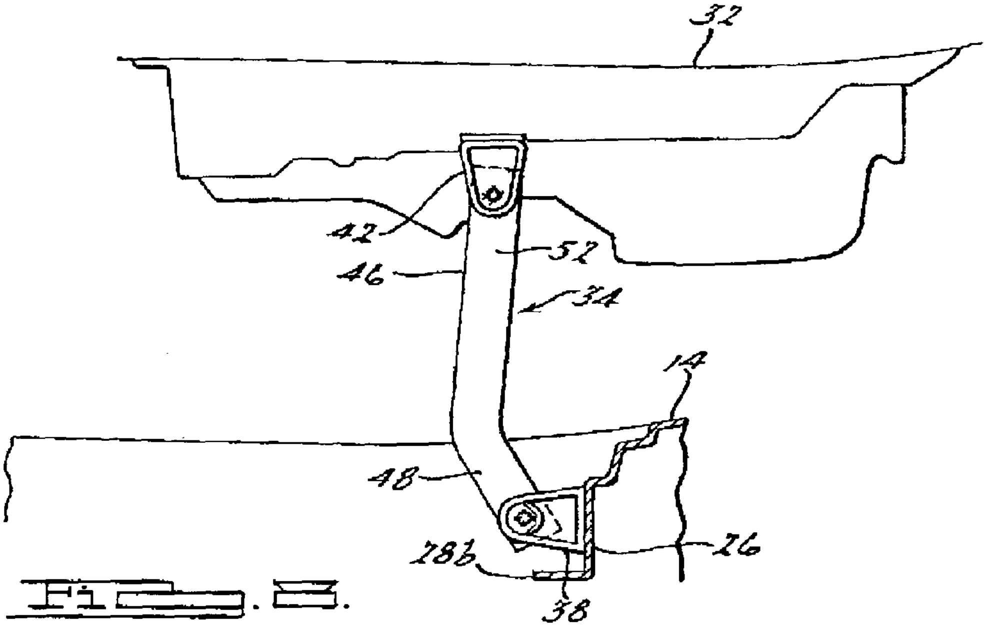

Referring to FIGS. 7 through 9, the operation of the rear side door 32 for a passenger side of the vehicle 12 is illustrated. The rear side door 32 is in a fully closed vehicle position relative to the vehicle body 14 as illustrated in FIG. 7. To open the rear side door 32, an operator (not shown) moves a handle (not shown) upon the rear side door 32 to release the latch from the latch member and the rear side door 32 is pivoted radially outwardly to a partially open vehicle position as illustrated in FIG. 8. The operator moves the rear side door 32 longitudinally rearwardly to remain parallel to the side 20 of the vehicle body 14. This movement consists of the connecting member 74 moving about the sprockets 70,72 and the load arms 46 pivoting about the pins 60,62 as the rear side door 32 is moved radially outward and rearward to remain parallel to the side 20 of the vehicle body 14. After the motion is complete, the rear side door 32 is in a fully open vehicle position relative to the vehicle body 14 as illustrated in FIG. 9. Preferably, the angular movement of the dual pivot hinge assembly 34 from the full closed vehicle position to the fully open vehicle position is one hundred fifty degrees (150°). It should be appreciated that the operation is reversed for moving the rear side door 32 from the fully open vehicle position to the fully closed vehicle position. It should also be appreciated that the dual pivot hinge assembly 34 may be applied to the front side door 30 and that the operation is similar for the front side door 30. It should further be appreciated that the dual pivot hinge assembly 34 allows the front side door 30 and/or the rear side door 32 to have a radial opening and closing door swing path, by which the moveable side door 32,34, through its complete door swing path of operation, will remain parallel to the side 20 of the vehicle body 14, from a fully closed vehicle position to a fully open vehicle position, and back to a fully closed vehicle position.

Figure 11:
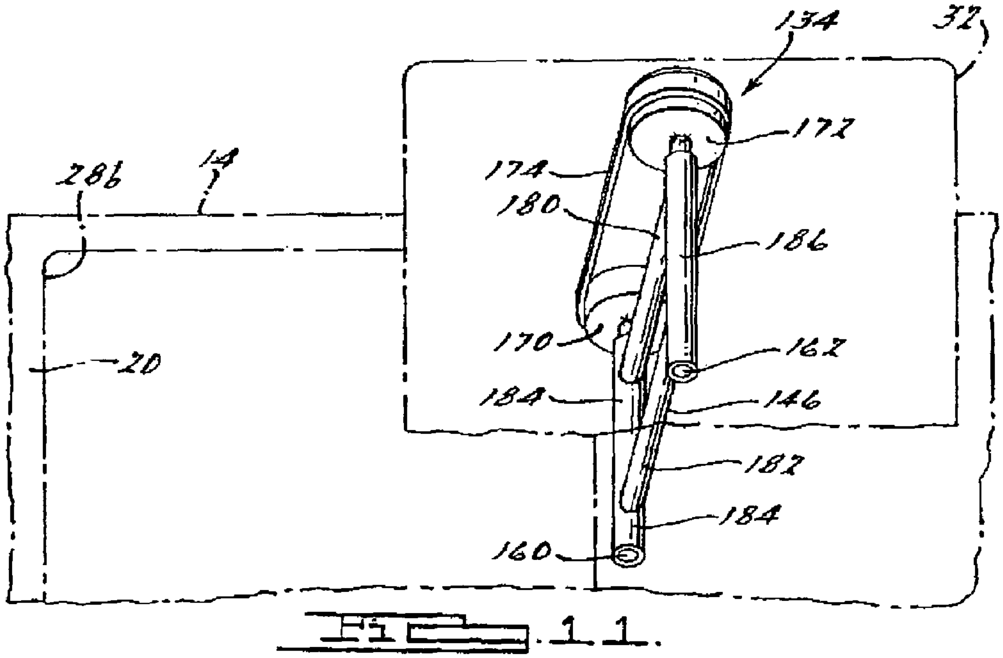
FIG. 11 is a view similar to FIG. 10 illustrating the dual pivot hinge assembly and side door in a partially open vehicle position.
Figure 12:
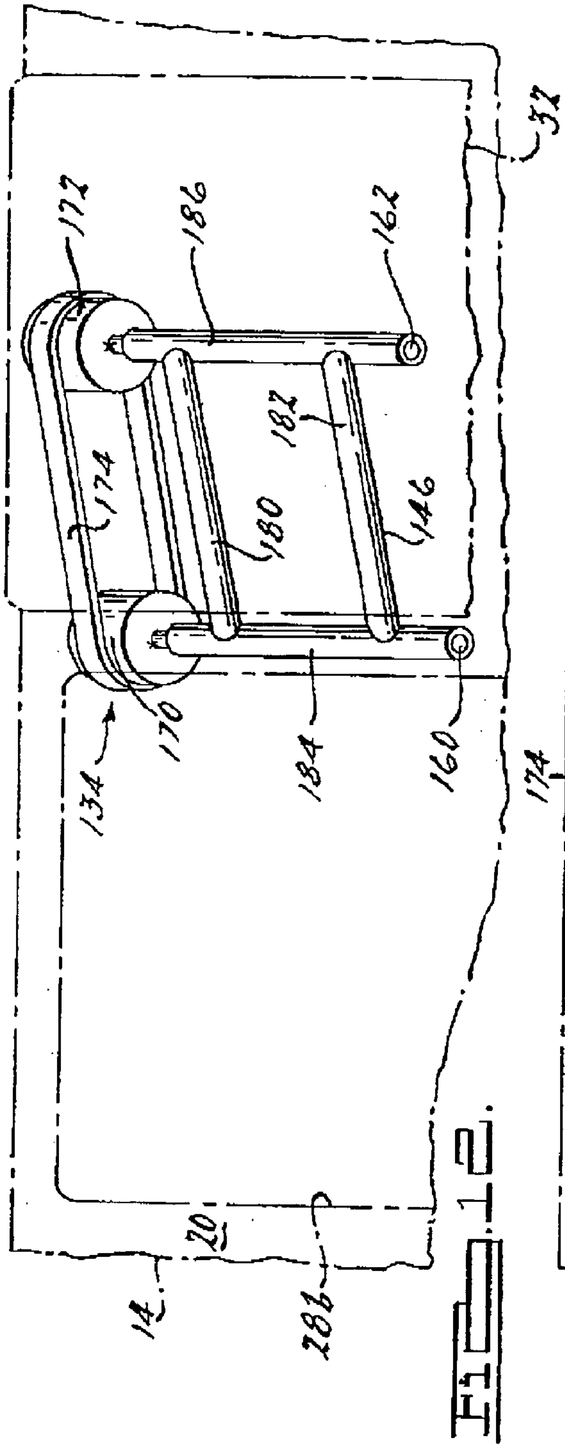
FIG. 12 is a view similar to FIG. 10 illustrating the dual pivot hinge assembly and side door in a fully open vehicle position.
Figure 10:
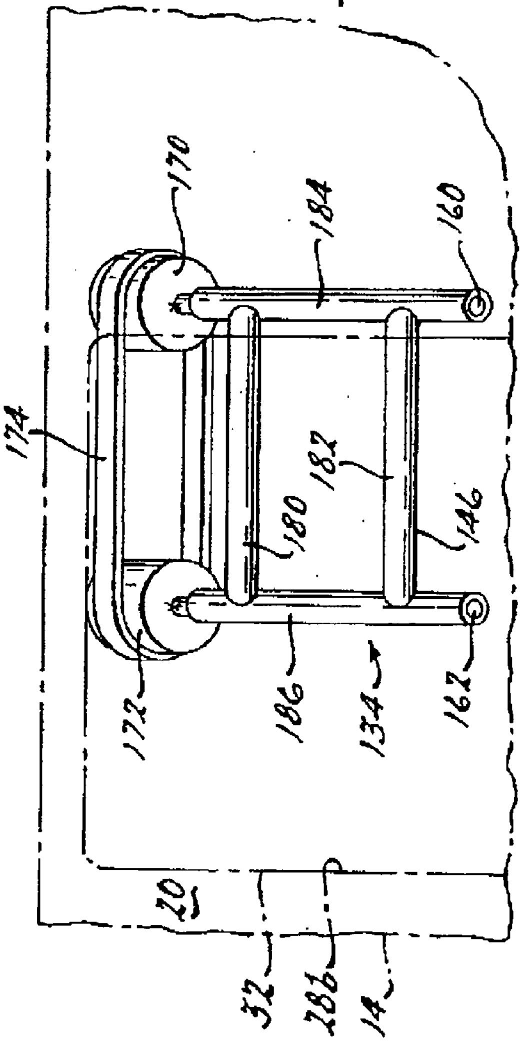
FIG. 10 is a perspective view of another embodiment, according to the present invention, of the dual pivot hinge assembly of FIG. 4 and a side door of the side door system of FIG. 1 illustrated in a fully closed vehicle position.

Referring to FIGS. 10 through 12, another embodiment, according to the present invention, of the dual pivot hinge assembly 34 is shown. Like parts of the dual pivot hinge assembly 34 have like reference numerals increased by one hundred (100). In this embodiment, the dual pivot hinge assembly 134 includes at least one load or hinge arm 146. The load arm 146 has an upper arm portion 180 extending longitudinally and a lower arm portion 182 spaced vertically from the upper arm portion 180 and extending longitudinally. The load arm 146 also has a body mounting portion 184 extending vertically at one end of the upper arm portion 180 and lower arm portion 182 and a door mounting portion 186 extending vertically at the other end of the upper arm portion 180 and lower arm portion 182. The body mounting portion 174 is pivotally connected to a pin 160 to form a first or inboard hinge axis. The door mounting portion 176 is pivotally connected to a pin 162 to form a second or outboard hinge axis.

The dual pivot hinge assembly 134 includes a first gear, sprocket, or pulley 170 mounted to the pivot pin 160 for a function to be described. The dual pivot hinge assembly 134 also includes a second gear, sprocket, or pulley 172 mounted to the pivot pin 162 for a function to be described. The pulleys 170 and 172 are generally cylindrical in shape. The pulleys 170 and 172 are secured to the pivot pins 160 and 162, respectively, by suitable means such as press-fitting. It should be appreciated that the first or body end pulley 170 is radially locked to the vehicle body 14. It should also be appreciated that the second or door end pulley 172 is radially locked to the rear side door 132. It should further be appreciated that the pulleys 170 and 172 are concentric with the first pivot axis and second pivot axis.

The dual pivot hinge assembly 134 includes a connecting member 174 disposed about the length of the load arm 146 and over the pulleys 170,172 for a function to be described. In one embodiment, the connecting member 174 is a belt such as a timing belt made of a plastic material or elastomeric material. It should be appreciated that the connecting member 174 could be a chain or cable. It should also be appreciated that the connecting member 174 engages the pulleys 170,172. It should further be appreciated that there is a device (not shown) to adjust and maintain tension in the connecting member 174. It should still further be appreciated that there is a device (not shown) to adjust phase relation (radial) between the body end pulley 170 and the door end pulley 172.

Referring to FIGS. 10 through 12, the operation of the rear side door 32 is illustrated. The rear side door 32 is in a fully closed vehicle position relative to the vehicle body 14 as illustrated in FIG. 10. To open the rear side door 32, an operator (not shown) moves a handle (not shown) upon the rear side door 32 to release the latch from the latch member and the rear side door 32 is pivoted radially outwardly to a partially open vehicle position as illustrated in FIG. 11. The operator moves the rear side door 32 longitudinally rearwardly to remain parallel to the side 20 of the vehicle body 14. This movement consists of the connecting member 174 moving about the pulleys 170,172 and the load arm 146 pivoting about the pivot pins 160,162 as the rear side door 32 is moved radially outward and longitudinally to remain parallel to the side 20 of the vehicle body 14. After the motion is complete, the rear side door 32 is in a fully open vehicle position relative to the vehicle body 14 as illustrated in FIG. 12. It should be appreciated that the operation is reversed for moving the rear side door 32 from the fully open vehicle position to the fully closed vehicle position. It should also be appreciated that the side door system 10 may apply the dual pivot hinge assembly 134 to the front side door 30 and the operation is similar for the front side door 30. It should further be appreciated that the dual pivot hinge assembly 134 allows the front side door 30 and/or the rear side door 32 to have a radial opening and closing door swing path, by which the moveable side door 30,32, through its complete door swing path of operation, will remain parallel to the side 20 of the vehicle body 14, from a fully closed vehicle position to a fully open vehicle position, and back to a fully closed vehicle position. It should still further be appreciated that a powered door feature can be achieved by applying torque to the arm at the body end or between the door structure and arm.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A dual pivot hinge assembly for a side door system of a vehicle comprising:

a body side-mounting bracket adapted to be connected to a vehicle body of the vehicle;

a door side-mounting bracket adapted to be connected to a side door of the side door system of the vehicle;

at least one arm and a first pin fixedly connected and non-rotatable to said body side-mounting bracket and pivotally connected to said at least one arm to pivotally connect said at least one arm to said body side-mounting bracket to form a first pivot axis and a second pin fixedly connected and non-rotatable to said door side-mounting bracket and pivotally connected to said at least one arm to pivotally connect said at least one arm to said door side-mounting bracket to form a second pivot axis;

a first member fixedly mounted and non-rotatable to said first pin and a second member fixedly mounted and non-rotatable to said second pin; and a movable and closed loop connecting member disposed and movable about said first member and said second member to allow the side door to remain parallel to a side of the vehicle body as the side door is pivoted radially outward and longitudinally.

2. A dual pivot hinge assembly as set forth in claim 1 wherein said first member is one of a gear, sprocket, and pulley.

3. A dual pivot hinge assembly as set forth in claim 1 wherein said second member is one of a gear, sprocket, and pulley.

4. A dual pivot hinge assembly as set forth in claim 1 wherein said connecting member is one of a belt, chain, or cable.

5. A dual pivot hinge assembly as set forth in claim 1 wherein said at least one arm includes a body portion and a door portion orientated at an angle greater than zero relative to said body portion.

6. A dual pivot hinge assembly as set forth in claim 5 wherein said door portion has a length greater than said body portion.

7. A dual pivot hinge assembly as set forth in claim 1 including a rub strip supported by said at least one arm and contacted by said connecting member.

8. A dual pivot door hinge assembly as set forth in claim 1 including a tensioner operatively supported by said at least one load arm and contacting said connecting member to apply tension to said connecting member.

* * * * *